(12) United States Patent
Roziere et al.

(10) Patent No.: US 10,919,157 B2
(45) Date of Patent: Feb. 16, 2021

(54) MULTI-DISTANCE DETECTION DEVICE FOR A ROBOT, AND ROBOT EQUIPPED WITH SUCH (A) DEVICE(S)

(71) Applicant: FOGALE NANOTECH, Nîmes (FR)

(72) Inventors: Didier Roziere, Nîmes (FR); Alain Courteville, Congénies (FR)

(73) Assignee: FOGALE NANOTECH, Nimes (FR)

( * ) Notice: Subject to any disclaimer, the term of this patent is extended or adjusted under 35 U.S.C. 154(b) by 0 days.

(21) Appl. No.: 16/316,325

(22) PCT Filed: Aug. 16, 2018

(86) PCT No.: PCT/EP2018/072248
§ 371 (c)(1),
(2) Date: Jan. 8, 2019

(87) PCT Pub. No.: WO2019/042784
PCT Pub. Date: Mar. 7, 2019

(65) Prior Publication Data
US 2020/0180162 A1    Jun. 11, 2020

(30) Foreign Application Priority Data

Aug. 28, 2017 (FR) ...................... 17 57915

(51) Int. Cl.
*B25J 13/08*    (2006.01)
*B25J 19/02*    (2006.01)
(Continued)

(52) U.S. Cl.
CPC .......... *B25J 13/086* (2013.01); *B25J 19/021* (2013.01); *B25J 19/026* (2013.01); *B25J 19/066* (2013.01); *B25J 9/1676* (2013.01); *B25J 15/00* (2013.01)

(58) Field of Classification Search
CPC .. B25J 13/086; B25J 19/066; B25J 19/02–04; B25J 19/06–068;
(Continued)

(56) References Cited

U.S. PATENT DOCUMENTS 6,079,738 A * 6/2000 Lotito .................. H03K 17/955
280/734
6,378,900 B1 * 4/2002 Stanley .................. B60N 2/002
280/735
(Continued)

FOREIGN PATENT DOCUMENTS

EP    0518836 A1    12/1992
EP    2834049 B1    3/2016
(Continued)

OTHER PUBLICATIONS

Schlegl, Capacitive Sensing for Robot Safety Applications, Austrian Marshall Plan Foundation, (Year: 2013).*
(Continued)

*Primary Examiner* — David L Singer
(74) *Attorney, Agent, or Firm* — Greer, Burns & Crain, Ltd.

(57) ABSTRACT

A device for the detection of objects for a robot, provided for equipping said robot, including:
at least one sensor, called approach sensor, implementing a first detection technology for detecting a neighbouring object; and
at least one sensor, called proximity sensor, implementing a second detection technology for detecting a neighbouring object, different from said the first technology, and having a range less than that of the at least one approach sensor. A robot equipped with such a device is also disclosed.

14 Claims, 4 Drawing Sheets

(51) Int. Cl.
*B25J 19/06* (2006.01)
*B25J 15/00* (2006.01)
*B25J 9/16* (2006.01)

(58) Field of Classification Search
CPC .............. B25J 9/1676; B25J 15/00; G05B 2219/37284; G05B 2219/37272; G05B 19/4061; H03K 17/955
See application file for complete search history.

(56) References Cited

U.S. PATENT DOCUMENTS

| | | |
|---|---|---|
| 2006/0217838 A1 | 9/2006 | Sugino et al. |
| 2010/0256814 A1 | 10/2010 | Smith |
| 2011/0067504 A1 | 3/2011 | Koyama et al. |
| 2014/0125357 A1* | 5/2014 | Blondin ............ G01R 27/2605 324/658 |

FOREIGN PATENT DOCUMENTS

| | | |
|---|---|---|
| WO | 2010/072193 A1 | 7/2010 |
| WO | 2012/091807 A2 | 7/2012 |

OTHER PUBLICATIONS

Navarro et al, Methods for Safe Human-Robot-Interaction Using Capacitive Tactile Proximity Sensors, 2013 IEEE/RSJ International Conference on Intelligent Robots and Systems (IROS) Nov. 3-7, 2013. Tokyo, Japan (Year: 2013).*
Schlegl et al, Virtual Whiskers—Highly Responsive Robot Collision Avoidance, 2013 IEEE/RSJ International Conference on Intelligent Robots and Systems (IROS) Nov. 3-7, 2013. Tokyo, Japan (Year: 2013).*
Hu et al, Planar capacitive sensors—designs and applications, Sensor Review 30/1 (2010) 24-39, Emerald Group Publishing Limited (Year: 2010).*
International Search Report from International Patent Application No. PCT/EP2018/072248, dated Oct. 18, 2018.
Written Opinion of the ISA from International Patent Application No. PCT/EP2018/072248, dated Oct. 18, 2018.

* cited by examiner

MULTI-DISTANCE DETECTION DEVICE FOR A ROBOT, AND ROBOT EQUIPPED WITH SUCH (A) DEVICE(S)

BACKGROUND

The present invention relates to a device for the detection of an object for a robot. It also relates to a robot equipped with such (a) device(s) for the detection of an object.

The field of the invention is non-limitatively that of the field of robotics, in particular the field of industrial robotics or service robots, for example medical or domestic, or also collaborative robots, also called "cobots".

STATE OF THE ART

Industrial or domestic robots, in particular cobots, generally comprise a body on which is fastened a functional head, presented in the form of a tool or a tool-holder, allowing them to perform one or more tasks.

In order to be able to use, or move, a robot or cobot, such as for example a robotic arm, in an environment comprising humans and/or objects, it is necessary to provide it with a detection capability making it possible on the one hand to avoid collisions with the surrounding objects/humans, and on the other hand to detect the objects/humans sufficiently early to allow it to adapt its path.

Low-cost sensors with small dimensions are known, for equipping a robot, such as capacitive sensors. These sensors have a short range and do not allow objects to be detected sufficiently early to enable the path to be adapted.

More expensive and more bulky sensors are also known that offer a greater detection range; such as time-of-flight sensors, optical sensors, etc. However, these sensors have a relatively small detection aperture, of the order of 600 maximum, leaving blind zones. In order to reduce these blind zones, it would be necessary to increase the number of sensors, which is not feasible due to the cost and bulk of these sensors. Moreover, these sensors do not generally allow detection of objects at a very short distance or in contact, due to their effective measuring range.

Thus, due to the existence of the blind zones and the detection limits, these sensors are not well adapted for anti-collision safety applications.

An aim of the present invention is to propose a detection device for a robot offering improved detection of objects, while still having an acceptable cost and bulk.

Another aim of the present invention is to propose a detection device for a robot having an acceptable cost and bulk and making it possible to carry out detection of both near and far objects, with fewer or no blind zones.

Another aim of the present invention is to propose a detection device for a robot making it possible to carry out detection of objects in the vicinity of the robot, with detection that is sufficiently reliable for it to be used as an anti-collision safety device.

Yet another aim of the present invention is to propose a detection device for a robot allowing both path adaptation and contact detection.

SUMMARY

At least one of these aims is achieved with a device for the detection of objects for a robot, provided for equipping said robot, comprising:

- at least one sensor, called approach sensor, implementing a first detection technology for detecting a neighbouring object; and
- at least one sensor, called proximity sensor, implementing a second detection technology for detecting a neighbouring object, different from said first technology, and having a range less than the range of said at least one approach sensor.

Thus, the detection device according to the invention proposes to carry out a detection of objects by a combination of two types of sensors offering different ranges.

The approach sensors, which are generally expensive and bulky, carry out the detection of objects at a greater distance and allow the path to be adapted. In combination with these approach sensors, proximity sensors with a smaller range are used in order to cover the blind zones that are not covered by the approach sensors, at a shorter distance, and make it possible to detect contact, in order for example to trigger a stop or emergency avoidance action, or also to change the compliance of the robot or to perform a tactile command, etc.

The proximity sensors are less expensive and less bulky compared with the approach sensors. Thus, the detection device allows improved detection of objects, while still having an acceptable cost and bulk. It allows adaptation of the path and detection of contact to be carried out with very little or no blind zone.

Thus, the detection device according to the invention is compatible with the requirements for reliable detection needed in order to be capable of use as an anti-collision safety device, in particular with respect to human operators moving in proximity to the robot.

In the present application, two alternating voltages are identical at a given frequency when they each comprise an alternating component that is identical at this frequency. Thus, at least one of the two voltages that are identical at said frequency can also comprise a direct component, and/or an alternating component with a frequency that is different from said given frequency.

Similarly, two alternating voltages are different at the working frequency when they have no alternating component that is identical at this working frequency.

In the present application, the term "earth potential" or "general earth potential" denotes a reference potential of the electronics, of the robot or of its neighborhood, which can be for example an electrical earth or an earth potential. This earth potential can correspond to a ground potential or to another potential, connected or not to a ground potential.

Furthermore, it is recalled that generally, objects that are not in direct electrical contact with a particular electric potential (objects that are electrically floating) tend to become polarized by capacitive coupling at the electric potential of other objects present in their neighborhood, such as for example ground or electrodes, if the overlap surfaces between these objects and those of the neighborhood (or the electrodes) are sufficiently large.

In the present application, "object" denotes any object or person that may be located in the neighborhood of the robot.

By "robot" is meant any robotic system, and in particular a robotic arm, a wheeled vehicle such as a trolley equipped with an arm or a handling system, or a robot of the humanoid type or provided with movement members such as limbs.

According to an advantageous characteristic, at least one approach sensor can carry out detection of an object up to a distance at least equal to 30 cm, and in particular up to a distance at least equal to 50 cm.

Depending on the technologies implemented, an approach sensor can for example carry out detection of an object at distances comprised between a minimum distance of several centimeters and a maximum distance of several tens of centimeters, or several metres. Generally, detecting an object or at least measuring the distance thereof is not possible below the minimum distance.

Thus, the approach sensor can detect an object when it is relatively far from the robot, which allows the robot time to modify/adjust its path with a view to avoiding said object, while continuing to perform the task that it is in the process of carrying out, for example.

According to an advantageous characteristic, at least one approach sensor can carry out detection at a frequency at least equal to 10 Hz. Ideally, an approach sensor can carry out detection up to a frequency of 100 Hz, or more.

Such a measurement frequency for detecting an object, when the latter is far from the robot, is sufficient for adjusting/modifying the path of the robot.

According to the invention, at least one approach sensor can be formed by any one of the following sensors:
- a time-of-flight sensor or a range-finder, optical or acoustic,
- a time-of-flight camera (3D),
- a stereoscopic optical device and/or structured light projection device, or
- an optical imaging device.

Thus, by way of non-limitative examples, the approach sensors can comprise:
- ultrasound time-of-flight sensors (SODAR). These sensors have centimetric resolution and can measure distances to objects present in a detection cone in the axis of the sensor (for example with an angle of 50 degrees), between a minimum distance (for example 20 cm) and a maximum distance (for example 1 m or more);
- optical time-of-flight sensors (LIDAR). These sensors also have centimetric resolution and can measure distances to objects present in a detection cone in the axis of the sensor (for example with an angle from several degrees to several tens of degrees), between a minimum distance (for example 10 cm) and a maximum distance (that can be of the order of several metres);
- time-of-flight cameras that apply the same optical principle of detection by time of flight with an imaging sensor. These sensors can measure distances to objects present in a field of view in the axis of the sensor (for example with an angle of several tens of degrees), between a minimum distance (for example 50 cm) and a maximum distance (that can be of the order of several metres);
- optical sensors that use structured light projection, or sensors based on stereo vision. These two principles for sensors have in common that they make it possible to measure a distance to an object present in a zone of intersection between either an illumination beam and a field of view, or two fields of view;
- imaging sensors, which make it possible by segmentation of images to identify the presence of an object in their field of view.

Advantageously, at least one proximity sensor can carry out detection of an object up to a distance at least equal to 10 cm, or ideally 20 cm to 30 cm.

Thus, at least one proximity sensor can detect an object when the latter is located in contact with the sensor, or at a distance that may range up to at least 10 cm, or ideally at least 20 cm or 30 cm. Thus, the proximity sensor has a range of complementary distance measurements, as well as a reduced bulk and reduced cost, compared with the approach sensors.

In addition, at least one proximity sensor can carry out detection at a frequency at least equal to 100 Hz, or ideally at least equal to 500 Hz or 1000 Hz.

Such a measurement frequency is particularly suitable for detecting objects very close to the robot, while leaving sufficient time for the robot to stop before colliding.

This measurement frequency is sufficient to ensure anti-collision safety for a robot, while using proximity sensors of acceptable cost and bulk.

According to a particularly preferred embodiment, at least one, in particular each, proximity sensor can be a capacitive sensor comprising at least one measurement electrode polarized at a first alternating electric potential different from a general earth potential, at a working frequency.

Capacitive sensors are particularly suitable for providing detection of objects at a short distance (less than 20-30 cm), or in contact, with a measurement frequency that is sufficient to ensure anti-collision safety, while having very reduced cost and bulk. In addition, equipping a robot with capacitive sensors can be carried out rapidly, simply, and with little or no modification of the architecture of the robot.

In this preferred embodiment, the detection device can comprise an electrode, or a surface, called guard electrode or surface, for guarding at least one measurement electrode, and polarized at an alternating electric potential ($V_G$), called guard potential, that is identical or substantially identical to the first alternating electric potential, at the working frequency.

Such a guard electrode makes it possible to protect the capacitive measurement electrode from external disturbances, such as leakage capacitances, and thus to increase the range and the accuracy of the measurement electrode.

In this preferred embodiment, at least one, in particular each, approach sensor can preferentially still be referenced to the guard potential ($V_G$). Thus, the approach sensor or each approach sensor is not detected by the measurement electrode(s), and does (do) not disturb the detection.

To this end, the device according to the invention can comprise at least one electrical converter arranged in order to:
- receive at least one electrical signal, called input signal, such as a power supply or control signal referenced for example to an earth potential and intended for at least one approach sensor, and reference said input signal to the guard potential ($V_G$); and/or
- receive at least one electrical signal, called output signal, transmitted by said at least one approach sensor, and reference said output signal to the electrical earth potential of a controller for which it is intended.

Thus, the approach sensor of the device according to the invention is globally referenced to the guard potential and therefore does not disturb the capacitive sensors.

According to embodiments, such an electrical converter can comprise at least one of the following elements:
- at least one galvanic isolation power supply, such as a DC/DC converter, in particular in order to generate an input power supply signal for at least one approach sensor;
- at least one electrical interface without galvanic contact, of the capacitive type or using an opto-coupler, for at least one input control signal, or at least one output signal; and/or one or more high-impedance inductances for receiving and transmitting at least one input signal or at least one output signal.

Advantageously, at least one, or a set of several, proximity sensor(s) can be positioned between at least two approach sensors so that the detection zone thereof covers a zone that is not covered by said approach sensors, in at least one direction, and in particular in the direction linking said two approach sensors together.

In particular, if the zone covered by the approach sensors has the shape of a truncated cone, with a minimal aperture angle and detection distance, the proximity sensor(s) can advantageously be positioned between the approach sensors so that their detection zones cover a zone between the zones covered by the approach sensors, and/or between these covered zones and the corresponding approach sensors.

Thus, the detection device according to the invention makes it possible to cover more space during the detection of objects and to reduce the blind zones.

In addition, at least one approach sensor can be positioned so that the detection zone thereof and a detection zone of one, or a set of several, proximity sensor(s) overlay one another in at least one direction, and in particular in the direction linking said contact and approach sensor(s) together.

In this embodiment, there is no blind zone between an approach sensor and a proximity sensor, which improves even more the detection of objects by the device according to the invention.

Preferentially, at least two approach sensors can be positioned such that the detection zones thereof at least partially overlay one another.

At least two approach sensors can also be positioned such that:
their detection zones overlay one another, for example beyond a distance of overlap, and
the common part of their detection zones and a detection zone of one, or of a set of several, proximity sensor(s) overlay one another;
in at least one direction, in particular in the direction linking said two approach sensors.

In this embodiment, there is no blind zone between the approach sensors, or at least no blind zone beyond the distance of overlap, if applicable.

According to another aspect of the same invention, a trim element is proposed for a robot, equipped with at least one detection device according to the invention.

Such a trim element can be presented in the form of a flexible covering forming a skin.

Such a trim element can be presented in the form of a flexible or rigid shell.

Such a trim element can be used in place of an existing trim element of a robot.

Such a trim element can be used in addition to an existing trim element of a robot. In this case, the trim element according to the invention can be placed over said existing trim element, in the form of a decorative element or a second shell, or also a covering.

According to yet another aspect of the present invention, a robot is proposed, equipped with:
at least one detection device according to the invention; and/or
a trim element according to the invention, in addition or in place of an existing trim element.

The robot according to the invention can comprise, for at least one segment of said robot:

a plurality of proximity sensors, distributed over said segment of the robot, and
a plurality of approach sensors, for example arranged at the level of at least one, and in particular each, of the ends of said segment.

The robot according to the invention can be equipped with a functional head, forming a tool or a tool-holder.

In an embodiment that is in no way limitative, said functional head can be used as a capacitive detection electrode, or measurement electrode. To this end, the functional head is isolated from the rest of the robot and polarized at the first alternating potential. The functional head can be isolated from the rest of the robot by an insulating surface inserted between said functional head and the rest of the robot.

In this case, the functional head can also be equipped with at least one approach sensor, in particular with several approach sensors, arranged on either side of said functional head, for example in the form of a ring.

Optionally, a guard surface can be provided, polarized at the guard potential ($V_G$), in order to guard said functional head used as a capacitive electrode. Such a guard surface can be inserted between said functional head and the rest of the robot, while being isolated both from the functional head and from the rest of the robot.

According to another aspect of the same invention, a method of path control for a robot according to the invention is proposed, said method comprising a step of generating, or modifying, a path of at least one part of said robot as a function of:
at least one signal supplied by at least one approach sensor, and
at least one signal supplied by at least one proximity sensor.

When the object is detected by an approach sensor without being detected by a proximity sensor this means that the object is sufficiently distant to carry out an avoidance action. In this case, the path of the robot (or of a mobile head of the robot) is generated/modified globally, and/or in an optimized manner, in order to avoid said object.

When the object is detected by a proximity sensor, this means that the object is very close to the robot and there is no more time to carry out an avoidance action. In this case, the path of the robot is modified in order to cause the robot to stop, or to carry out a short-distance avoidance action.

BRIEF DESCRIPTION OF THE DRAWINGS

Other advantages and characteristics will become apparent from the detailed description of embodiments that are in no way limitative, and the attached drawings, in which.

DETAILED DESCRIPTION

It is well understood that the embodiments that will be described hereinafter are in no way limitative. In particular, variants of the invention can be envisaged comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements that are common to several figures retain the same reference.

Figure 1:
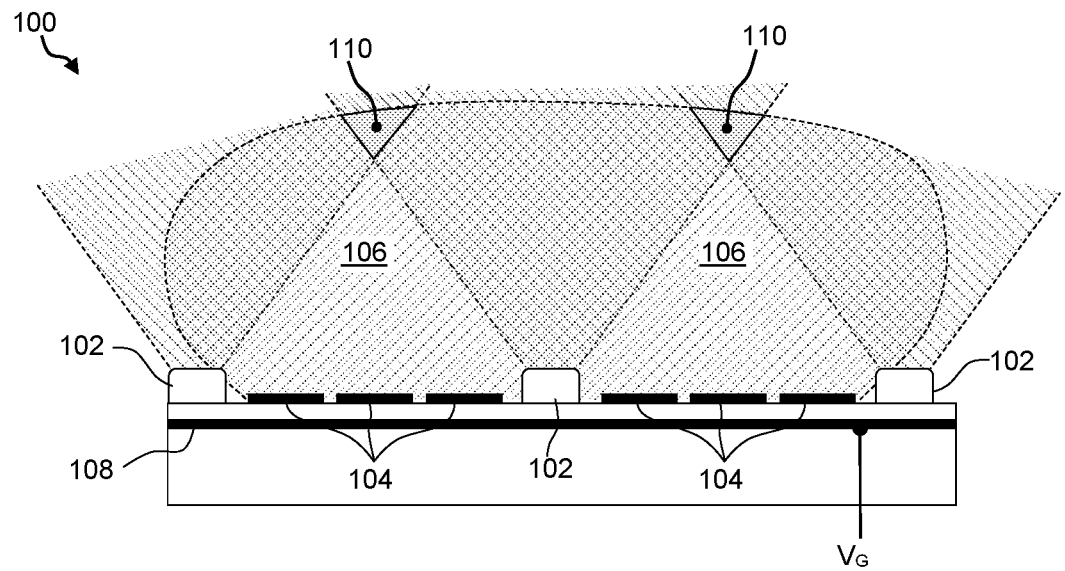
FIGS. 1 and 2 are diagrammatic representations of two non-limitative examples of the principle of a detection device according to the invention.

FIG. 1 is a diagrammatic representation of a non-limitative example of the principle of a detection device according to the invention.

The detection device 100 in FIG. 1 comprises sensors 102, called approach sensors, and sensors 104, called proximity sensors.

FIG. 1 shows three approach sensors 102 and six proximity sensors 104, with three proximity sensors 104 between two consecutive approach sensors 102.

The approach sensors 102 have a larger detection range compared with that of the proximity sensors 104.

The approach sensors 102 can be selected from the following sensors:
- a time-of-flight sensor or a range-finder, optical or acoustic,
- a time-of-flight camera (3D),
- a stereoscopic optical device and/or structured light projection device, or
- an optical imaging device.

Of course, it is possible to use any combination of the sensors listed above such that the approach sensors are any combination of these sensors.

According to a preferential embodiment, the approach sensors 102 implemented can be optical time-of-flight (point) sensors.

The approach sensors 102 carry out detection of an object up to a distance of at least 50 cm, or even more, up to several metres. The detection frequency of these sensors is typically of the order of around one hundred Hertz.

Each approach sensor 102 has a detection zone in the shape of a cone, the summit of which is located at the level of the approach sensor 102. The angle of aperture of the cone of each approach sensor 102 is of the order of several tens of degrees, and in particular of the order of 50° or 60°. Inasmuch as these approach sensors cannot detect objects at a distance less than a minimum distance (for example 10 cm), their detection zone is shaped more like a truncated cone.

As can be seen in FIG. 1, starting from a certain distance, the detection zones of two successive/adjacent approach sensors 102 overlay one another. However, there is also a zone 106, between two consecutive approach sensors 102, which is not covered by the approach sensors 102. If an object is located in this uncovered zone 106, it is not detected by any approach sensor 102.

The proximity sensors 104 carry out detection of an object at a maximum distance of 25-30 cm. The detection frequency of these sensors is of the order of 1000 Hz.

As the proximity sensors 104 are positioned between the approach sensors 102, they detect the objects located in the zones 106, which are not covered by the approach sensors 102.

In particular, in at least one direction:
- the distance between two consecutive approach sensors 102, and
- the number of proximity sensors 104 arranged between these two consecutive approach sensors 102;

are chosen such that the detection zone of the proximity sensors 104 covers the majority, and preferentially the whole, of the zone 106, which is not covered by two consecutive approach sensors 102.

In the example shown in FIG. 1, each proximity sensor 104 is formed by a capacitive electrode, called measurement electrode hereinafter.

Each measurement electrode 104 is provided to be polarized at a first alternating electric potential, different from an earth potential, at a working frequency. The detection of an object is carried out by measuring a signal relating to the capacitance, called electrode-object capacitance, detected by each measurement electrode. This detection principle is well known and therefore will not be described in greater detail here.

In addition, in order to avoid leakage capacitances or parasitic capacitances capable of causing a disturbance, each measurement electrode 104 is guarded at an alternating electric potential, called guard potential, denoted $V_G$, that is identical to the first alternating potential, at the working frequency. To this end, the detection device 100 comprises a guard electrode 108, forming a guard plane, and common to all the measurement electrodes 104.

According to an alternative embodiment, it is possible to use an individual guard electrode for each measurement electrode 104.

In the example shown in FIG. 1, there is a zone 110 where the following overlay one another; the detection zones of:
- two consecutive approach sensors 102, and
- proximity sensors 104 arranged between these two consecutive approach sensors 102.

Thus, there is no blind zone in which an object located in proximity to the detection device is not detected.

Figure 2:
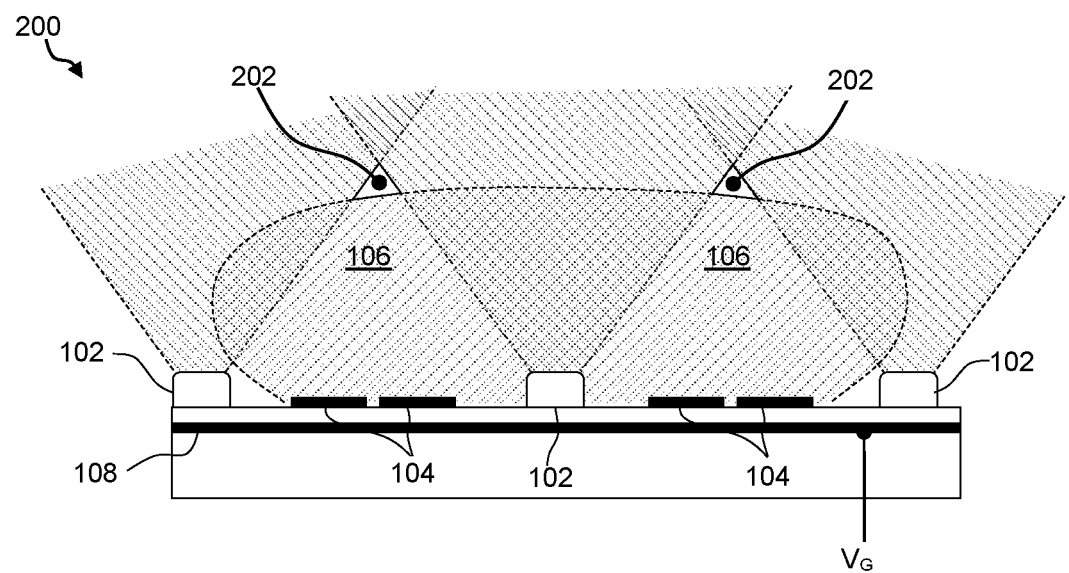

FIG. 2 is a diagrammatic representation of another non-limitative example of the principle of a detection device according to the invention.

The device 200 comprises all the elements of the device 100 in FIG. 1, with the only difference being that there are only two proximity sensors 104, or measurement electrodes 104, between two consecutive approach sensors 102.

As a result, as shown in FIG. 2, the detection zone of the proximity sensors 104 is smaller, and covers the majority of the uncovered zone 106 between two consecutive approach sensors 102, but not the whole of this zone 106. In particular, the detection zone of the proximity sensors 104, and the zone overlaid by two consecutive approach sensors 102, do not overlay one another.

Consequently, there is a small blind zone 202 between two consecutive approach sensors 102 in which an object is not detected.

Of course, the detection of the device 200 is less efficient than that of the device 100 in FIG. 1, while remaining sufficiently functional.

A detection electronics is associated with the detection device. Examples of detection electronics will be described hereinafter with reference to FIGS. 5 and 6.

Figure 3:
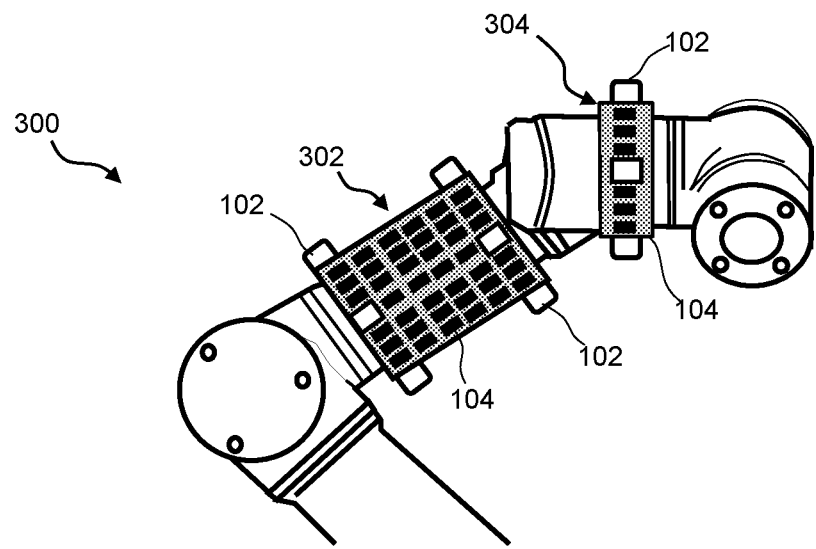
FIG. 3 is a diagrammatic representation of a non-limitative example of a robot equipped with two detection devices according to the invention.

FIG. 3 is a partial diagrammatic representation of a non-limitative example of a robot according to the invention.

The robot 300, shown in FIG. 3, is presented in the form of a robotic arm comprising several articulations connecting several segments together. Each articulation makes it possible to carry out a rotation about an axis of rotation.

The robot 300 is equipped with two detection devices 302 and 304 according to the invention. Each detection device 302 and 304 can, for example, be carried out according to the principle described with reference to FIG. 1 or FIG. 2.

As shown in FIG. 3, each detection device 302 and 304 is presented in the form of a trim element, such as a cover or a skin or also a decorative element to be positioned over an existing cover of the robot. Of course, according to an alternative embodiment, each detection device can be incorporated into/on an existing trim element of the robot.

The detection device 302 is presented in the form of a cylinder comprising at the level of each of its ends a ring of approach sensors 102 comprising four equidistant approach sensors 102. The detection device 302 also comprises a multitude of proximity sensors 104 distributed over the entire surface of the cylinder and between the approach sensors 102.

The detection device 304 is presented in the form of an annular strip, or a bracelet, comprising a ring of approach sensors 102 comprising four equidistant approach sensors 102. The detection device 304 also comprises three proximity sensors 104 between two successive approach sensors 102.

Of course, the number and the position of the sensors are non-limitative.

Figure 4:
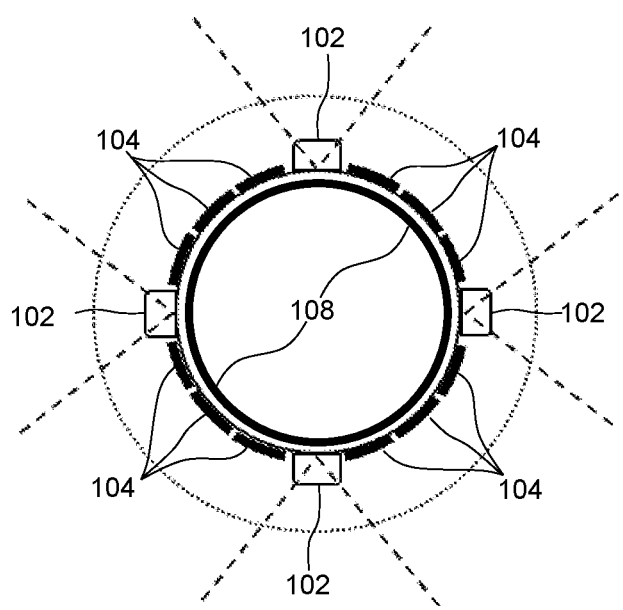
FIG. 4 is a cross-sectional diagrammatic representation of a detection device equipping the robot in FIG. 3.

FIG. 4 is a cross-sectional diagrammatic representation of a detection device equipping the robot 300 in FIG. 3.

The device shown in FIG. 4 can be any one of the devices 302 or 304 in FIG. 3.

As can be seen in FIG. 4, the detection zones of two successive approach sensors 102 do not overlay one another. A part of the uncovered zone located between two successive approach sensors 102 is covered by the proximity sensors 104 located between these approach sensors.

It is also noted that the detection range of the proximity sensors 104 is much smaller than that of the approach sensors 102.

Figure 5:
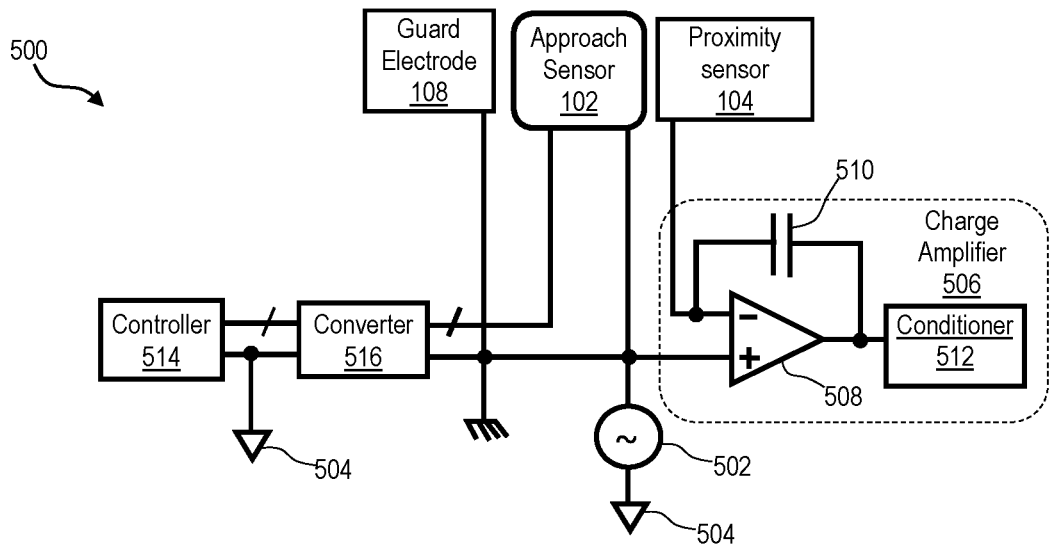
FIGS. 5 and 6 are diagrammatic representations of two examples of electronics that can be implemented in a detection device according to the invention.

FIG. 5 is a diagrammatic representation of an example of electronics that can be implemented in/with a detection device according to the invention.

The electronics 500 shown in FIG. 5 can be implemented with the device 100, 200, 302 or 304 in FIGS. 1-4.

In the example shown in FIG. 5, the electronics 500 comprises an oscillator 502, referenced to a general ground 504, which generates an alternating excitation voltage, denoted $V_G$, used for polarizing each measurement electrode 104, acting as a proximity sensor, and also used as a guard potential in order to polarize the guard electrode 108.

The electronics 500 comprises detection electronics 506 composed of a current or charge amplifier, represented by an operational amplifier 508 and a counter-reaction capacitor 510. In the embodiment presented, this charge amplifier supplies at output a voltage proportional to the coupling capacitance between the measurement electrode and an object in proximity.

The detection electronics 506 also comprises a conditioner 512 making it possible to obtain a signal representative of the sought coupling capacitance $C_{eo}$, and/or the presence or proximity of an object or a body. This conditioner 512 can comprise for example a synchronous demodulator for demodulating the signal with respect to a carrier, at a working frequency. The conditioner 512 can also comprise an asynchronous demodulator or an amplitude detector. This conditioner 512 can of course be produced in an analogue and/or digital form (microprocessor) and comprise all necessary means of filtering, conversion, processing, etc.

In the configuration shown in FIG. 5, each measurement electrode 104 is polarized via the operational amplifier 508. In particular, the oscillator 502 is connected to the positive input of the operational amplifier 508 and the measurement electrode is connected to the negative input of the operational amplifier 508.

The guard plane formed by the guard electrode 108 is connected to the negative input of the operational amplifier 508.

The detection electronics 500, or at least its sensitive part with the charge amplifier 508, can be referenced (or supplied by electrical power supplies referenced) to the guard potential $V_G$, in order to minimize parasitic capacitances.

The detection electronics 500 can also be referenced, more conventionally, to the earth potential 504.

The approach sensors 102 of the detection device are supplied/controlled by a controller 514. This controller 514 delivers (power supply or control) signals referenced to the general earth potential 504, different from the guard potential $V_G$.

Without precautions, such signals, and consequently the approach sensors 102, could trigger involuntary detection by the measurement electrodes 104 used as proximity sensor, due to the presence of the earth potential.

In order to avoid this, the electronics of the detection device comprises a converter 516 arranged between the controller 514 and the approach sensor 102 and have the function of:

receiving at least one electrical signal, called input signal, such as a power supply or control signal transmitted by the controller 514 and intended for the approach sensor 102, and referencing said input signal to the guard potential $V_G$; and receiving at least one electrical signal, called output signal, transmitted by said approach sensor 102 and intended for the controller 514, and referencing said output signal to the electrical earth potential 504 of said controller 514.

Thus, each approach sensor, as well as the connectors and the electronics associated therewith, are supplied by signals referenced to the guard potential $V_G$ and do not disturb the measurement electrode 104.

Figure 6:
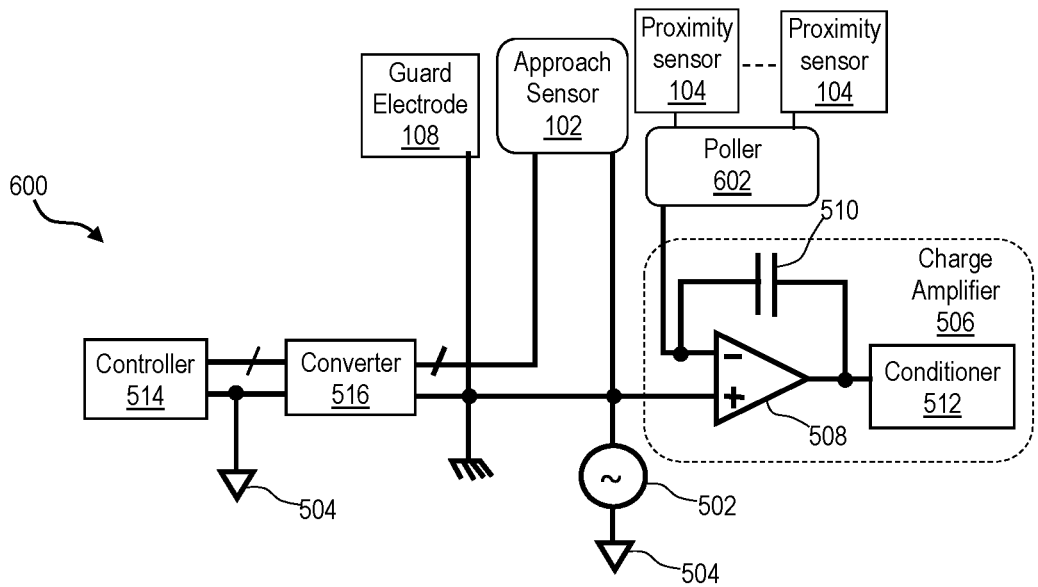

FIG. 6 is a diagrammatic representation of another example of electronics that can be implemented in/with a detection device according to the invention.

The electronics 600, shown in FIG. 6, can be implemented with the device 100, 200, 302 or 304 in FIGS. 1-4.

The electronics 600 comprises all the elements of the electronics 500 in FIG. 5.

The electronics 600 also comprises a polling means 602, which can be for example a switch, making it possible to connect each measurement electrode 104 in turn to the detection electronics 506. This architecture has the advantage of using a detection electronics common to several measurement electrodes.

Of course, the electronics 500, 600 can also comprise polling means (not shown) for controlling and/or sequentially polling approach sensors 102.

Figure 7:
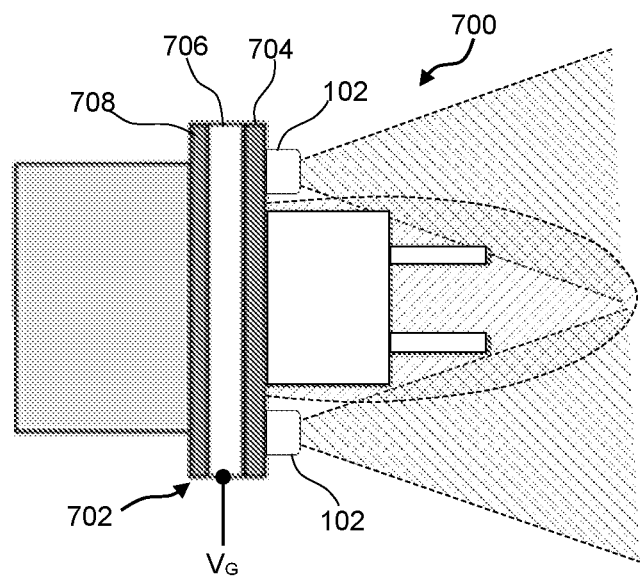
FIG. 7 is a diagrammatic representation of a non-limitative example of a functional head that can equip a robot according to the invention.

FIG. 7 is a diagrammatic representation of a non-limitative example of a functional head that can be implemented in a robot according to the invention.

The functional head 700, shown in FIG. 7, is presented in the form of a tool or a tool-holder. In particular, the functional head 700 is a motorized gripper.

The functional head 700 comprises, or is combined with, a separation interface 702, which separates it from the rest of the robot. This separation interface 702 comprises at least one electrical insulator 704 which electrically insulates the functional head 700 from the rest of the robot.

Optionally, the separation interface 702 comprises a guard plane formed by a conductive plate 706, separated from the functional head 700 by the insulator 704, and separated from the rest of the robot by a second insulator 708.

The conductive plate 706 is polarized at the guard potential $V_G$. The functional head 700 itself is polarized at the first alternating electric potential, which is identical to the guard potential $V_G$.

Under these conditions, the functional head 700 acts as a capacitive electrode, or a measurement electrode, in the same way as the measurement electrodes 104 in FIGS. 1-4. Consequently, the functional head 700 can be used as a proximity sensor, in the same way as each measurement electrode 104.

In addition, the functional head 700 comprises one or more approach sensors 102. In FIG. 7, two approach sensors 102 can be seen. Thus, the functional head 700 can be used as a detection device according to the invention in order to carry out detection of objects in the same way as the detection devices 100, 200, 302 and 304 in FIGS. 1-4. The approach sensors 102 of the functional head 700 carry out detection of an object when the latter is located at a distance from the functional head 700, and the rest of the functional head 700 carries out detection of an object when the latter is located close to the functional head 700, and in particular, in a zone not covered by the approach sensors 102.

The approach sensors 102 are particularly useful with a functional head 700 used as capacitive electrode, as they contribute information on the direction in which an object arrives, which is not supplied by the capacitive electrode in this case. Thus, if the object is detected by an approach sensor 102, an avoidance path can be taken. Conversely, if the object is approaching in a zone which is not covered by the approach sensors 102, it is nevertheless detected by the capacitive electrode in time to stop the robot and avoid a collision.

The signals exchanged with the approach sensors 102 with which the functional head is equipped can be converted using a voltage converter, such as for example the voltage converter 516 in FIGS. 5 and 6. Thus, the approach sensors 102 do not disturb the capacitive detection carried out by the functional head 700 or another measurement electrode 104 with which the robot is equipped.

In addition, when the functional head 700 comprises an electrical element, such as for example an electric motor or other sensors, the signals exchanged with said electrical element can be converted using a voltage converter, such as for example the voltage converter 516 in FIGS. 5 and 6, in a similar or identical manner to the approach sensors 102. Thus, this electrical element does not disturb the capacitive detection carried out by the functional head 700 or another measurement electrode 104 with which the robot is equipped.

Of course, the invention is not limited to the examples that have just been described, and numerous modifications can be made to these examples without departing from the scope of the invention.

The invention claimed is:

1. A device for the detection of objects for a robot, provided for equipping said robot, comprising:
    at least one approach sensor implementing a first detection technology for detecting a neighbouring object; and
    at least one proximity sensor implementing a second detection technology for detecting a neighbouring object, different from said first technology and having a range less than the range of said at least one approach sensor;
    wherein at least one proximity sensor is a capacitive sensor comprising at least one measurement electrode polarized at a first alternating electric potential different from a general earth potential, at a working frequency; and
    wherein at least one approach sensor is referenced to an alternating electric potential (Vo), called guard potential, that is identical or substantially identical to the first potential, at the working frequency.

2. The device according to claim 1, characterized in that at least one approach sensor carries out detection of an object up to a distance of about 30 cm.

3. The device according to claim 1, characterized in that at least one approach sensor carries out detection of an object up to a distance of about 50 cm.

4. The device according to claim 1, characterized in that said at least one approach sensor is formed by:
    a time-of-flight sensor or a range-finder, optical or acoustic,
    a time-of-flight camera,
    a stereoscopic optical device and/or structured light projection device, or
    an optical imaging device.

5. The device according to claim 1, characterized in that at least one proximity sensor carries out detection of an object up to a distance of about 10 cm.

6. The device according to claim 1, characterized in that it comprises an electrode, or a surface, called guard electrode or surface, for guarding at least one measurement electrode, and polarized at an alternating electric potential (Vo), called guard potential, that is identical or substantially identical to the first potential, at the working frequency.

7. The device according to claim 1, characterized in that at least one, or a set of several, proximity sensor(s) is positioned between at least two approach sensors so that the detection zone thereof covers a zone that is not covered by said approach sensors.

8. The device according to claim 1, characterized in that at least one approach sensor is positioned so that the detection zone thereof overlays, at least partially, a detection zone of one, or a set of several, proximity sensor(s).

9. The device according to claim 1, characterized in that at least two approach sensors are positioned so that the detection zones thereof at least partially overlay one another.

10. A trim element for a robot, equipped with at least one detection device according to claim 1.

11. A robot equipped with:
    at least one detection device according to claim 1; and/or
    a trim element equipped with at least one detection device according to claim 1.

12. The robot according to claim 11, characterized in that it comprises, for at least one segment of said robot:

a plurality of proximity sensors, distributed over said segment of the robot; and a plurality of approach sensors, arranged at the level of at least one of the ends of said segment.

13. The robot according to claim 11, characterized in that it comprises a functional head, forming a tool or a toolholder, used as capacitive detection electrode, said functional head:

forming a capacitive proximity sensor; and comprising at least one approach sensor arranged on either side of said functional head.

14. A method of path control for a robot according to claim 11, comprising a step of generating, or modifying, a path of at least one part of said robot as a function of:

at least one signal supplied by at least one of each said approach sensor; and at least one signal supplied by at least one of each said proximity sensor.

* * * * *